May 6, 1930.   J. WESTLY   1,757,695
ELECTRODE
Filed Sept. 23, 1926

INVENTOR.
Jens Westly,
BY
*Dorsey & Cole*
ATTORNEYS

Patented May 6, 1930

1,757,695

UNITED STATES PATENT OFFICE

JENS WESTLY, OF KRISTIANSAND, NORWAY, ASSIGNOR TO DET NORSKE, AKTIESEL-SKAB FOR ELEKTROKEMISK INDUSTRI OF NORWAY, OF OSLO, NORWAY

ELECTRODE

Application filed September 23, 1926, Serial No. 137,267, and in Norway September 30, 1925.

In some furnaces, and especially in the electrolysis of fused salts we have to deal with currents of very large amperages at relatively low voltages. For instance, a cell for the electrolytic reduction of aluminum oxide in a bath of fused cryolite operates at from 6 to perhaps 7.5 volts, and may consume from 8,000 to 25,000 amperes and more, depending upon its size. It is evident that a voltage loss in the electrodes or electrode contacts which would be considered normal and harmless in an electric arc furnace, for example, where voltages up to 100 volts or more per electrode may be employed, would be absolutely prohibitive in the case of a furnace or cell using only six to ten volts. Such voltage losses are avoided in the prior art by making the electrodes short, for example in the aluminum furnace they are usually not over 16" long, and connecting them to the bus by means of relatively heavy copper or iron rods or bars. These are securely embedded in the tops of the electrodes, and perform the double function of supporting the electrodes (and thus controlling their positions in the furnace or cell) and leading the current into them. As the electrodes are consumed they are gradually lowered, until they become too short for further use. There is thus always a residual part of the electrode which must be removed and reworked in the electrode plant.

To avoid the losses due to these electrode residues, it would be desirable to use longer electrodes or even continuous electrodes such as are used in electric arc furnaces, but the voltage losses involved make this difficult. In particular, it has been found advantageous to use the continuous self-baking electrode of U. S. A. Patent No. 1,440,724 dated January 2nd, 1923 of Carl Wilhelm Söderberg, but considerable difficulty has been found in introducing the very large electric currents into this electrode without either contaminating the product of the electrolytic cell with some iron from inserted iron ribs in the shell structure of the electrode, or else wasting an unduly large amount of power in voltage losses in the anode.

The contamination of the furnace product from iron or other metal in the shell structure of the electrode may to a certain extent be avoided by employing the method described in my U. S. A. Patent No. 1,679,284. The present invention however, represents a better method of avoiding such contamination as no metal whatever is introduced into the furnace with the electrode.

The object of the present invention is to introduce large currents into electrodes, especially those used in the electrolysis of fused salts, with a minimum of voltage loss in the electrode and electrode contacts, and in such a manner as not to limit the length of electrode which may be used; thus permitting the use of continuous electrodes, either self-baking or composed of previously baked sections, joined together by means well known to the art. I accomplish this by providing a plurality of current-carrying means inserted in the electrode in such a way that they make contact close to the working end of the electrode and having their outer ends arranged for connection to the source of current, for instance by the attachment of flexible cables.

These current-carrying means should be made of a material having a specific electrical conductivity relatively high as compared with the electrode, and may for instance be of graphite, in which case they will not contaminate the metal produced in the cell, but will be consumed with the rest of the anode as it is gradually lowered into the cell. However I prefer to make these current-carrying means wholly or in part of metal, in which case they should preferably be removable, although there may be cases when such removal would not be necessary. On account of the high melting point and the strength of iron at the elevated temperatures involved, I prefer to make these inserted current-carrying means of some form of iron, such as steel, but I may also use other metals such as copper, or a combination of two different metals, e. g. copper coated with iron. In order to make them easily removable, when the electrode has been lowered to the point where they might soon contaminate the bath, I may make them wedge-shaped, or composed of a plurality of wedge-shaped parts, or they may be conical, or may be provided with an external screw-thread of appropriate pitch so that they may be unscrewed from the electrode by rotating them about their axes. These different means may also be combined, as by employing a screw-thread cut in a conical or tapered surface. In order to facilitate the loosening of the metal from the surrounding carbon, especially in the case of self-baking electrodes, I have found it advantageous to provide means for cooling these inserts when the time comes to remove them. Thus the inserts may take the form of thick-walled tubes, closed at one end, which may be cooled by injecting a blast of air, or air and water spray, into them. This causes the metal to contract away from the carbon which has been baked upon it, and also makes the insert mechanically stronger and better able to withstand the stresses involved in its removal.

In general I find it advantageous to arrange these inserts in a plurality of rows around the circumference of the electrode, one above another, in such a manner that all the inserts of a given row are equidistant from the bottom of the electrode. This insures an even division of the current supply among the inserts of the row in use, and consequently a minimum voltage loss due to resistance. When the electrode has been lowered to such a point that there is danger that these inserts will soon contaminate the product, the electrical connection are transferred to the row above and the bottom row is removed. To avoid unnecessary carbon consumption the holes remaining in the electrode after removal of the inserts may be plugged in any suitable way, as by stamping in electrode mix. In arranging these inserts in the electrode, I have found it advantageous to incline them all inwardly and downwardly, say at an angle of about 45 degrees to the axis of the electrode, as this improves their efficiency and makes it easier to remove them.

Instead of arranging the inserts in rows as above described, they may be arranged in a spiral, or irregularly if desired, but in most cases I find the arrangement above described to be preferable. In employing these inserts with the continuous self-baking electrode, they take the place of the ribs previously employed in connection with the metallic shell structure of the electrode, so that the latter is simplified and becomes simply a cylinder of sheet metal, (preferably of the same metal as is being produced in the cell) usually provided with suitable holes through which the ends of the inserted current-carrying means may project. These inserts may be placed in position and suitably supported, and then the electrode paste may be rammed in around them to fill the shell-structure, as is usual in the manufacture of such electrodes. The supporting clamps which carry the electrode are so arranged in relation to the inserted current-carrying means that the latter can pass between the clamps as the electrode is lowered. If desired, the supporting clamps may also be connected to the anode bus, so that a part of the current may pass through the clamps and the metal mantle of the electrode into its lower end, but in practice it will be found that most of the current is carried by the inserts, as by virtue of their position and downward inclination they make contact with a part of the electrode which is better baked and consequently has a better conductivity than the portion which is in contact with the shell under the clamps.

In employing these inserts in the continuous self-baking electrode, I have also found it advantageous at times to insert the metallic studs firmly but removably in previously baked blocks of carbon, either amorphous or graphitized, before placing them in position in the electrode mass. The outer surfaces of the carbon blocks may be scored or roughened or otherwise treated to facilitate the adhesion of the electrode mix to them when the electrode is baked, and the metal stud may be fastened in them by screwing it in, making it in a tapered shape and driving it into a tapered hole, or in any other convenient and suitable way.

An alternative method of making these inserted contacts involves the use of a relatively low-melting-point metal such as aluminum. This may be placed in downwardly inclined holes, closed at the bottom, cored or otherwise formed in the carbon, while the current is introduced thru rods, preferably of metal, which have one end connected with the source of current, as by flexible cables, and the other end inserted in the molten metal in the above-mentioned inclined holes. The heat from the furnace melts the aluminum or other low-melting metal, and keeps it molten, and the molten metal provides excellent electrical contact between the carbon electrode and the outwardly-projecting rod. The holes may be formed, in the case of a continuous self-baking electrode, by inserting aluminum tubes in the proper position in the electrode mass when it is stamped into the electrode mantle. If necessary the rods may be cooled to prevent them from melting. Ordinarily I have found it most practical to insert the contacts into the electrode from the outside. If the electrode is made short, the contacts may of course with the same effect be inserted vertically from the top of the electrode. The contacts should then be made so long that they conduct the current to a point close to the surface of the bath.

In the accompanying drawing I have illustrated a number of forms in which the invention may be practiced.

Figure 1:
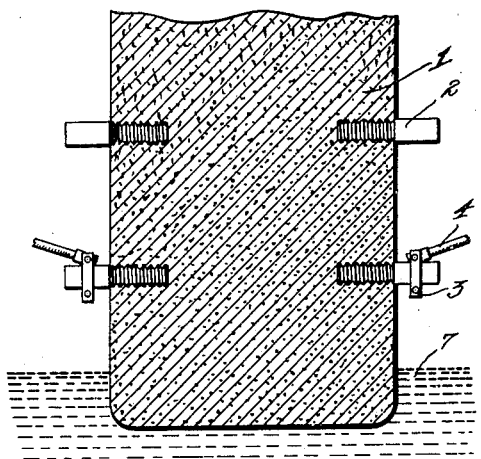
Fig. 1 is a vertical section of an electrode provided with horizontally placed screw contacts.
Figure 2:
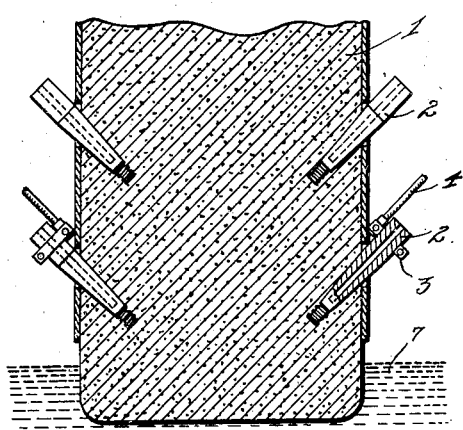
Fig. 2 is a vertical section of an electrode provided with conical contacts inwardly and downwardly inclined and provided with screw-thread. The contacts are thick-walled tubes closed at one end.
Figure 3:
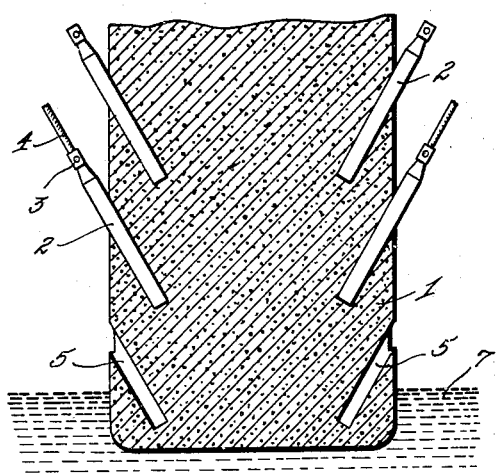
Fig. 3 is a vertical section of an electrode provided with double wedge-shaped contacts sloping downwardly into the electrode.
Figure 5:
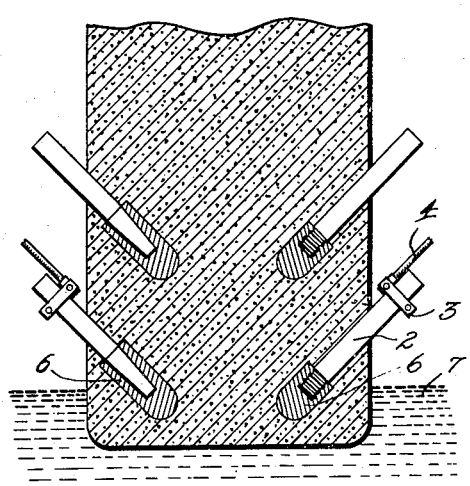
Figure 4:
Fig. 4 shows the detailed arrangement of a double wedge-shaped contact.

Fig. 5 is a vertical section of an electrode provided with contacts inserted into previously baked blocks of carbon. The contacts shown on the right side of the electrode are fastened to the carbon blocks by screwing. The contacts on the left side are tapered and fastened by driving them into a tapered hole in the carbon blocks.

Figure 6:
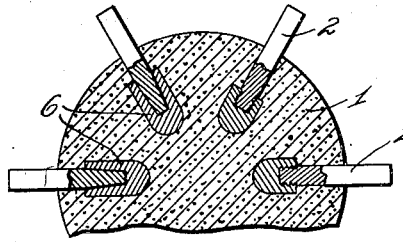

Fig. 6 is a cross section of the electrode shown in Fig. 5.

In all figures the same numbers designate the same parts. 1 is an electrode, 2 is the current-carrying means, 3 is a cable-shoe, 4 is a cable for supply of the electric current, 5 is a hole from which the insert has been removed, 6 is a previously baked block of carbon or graphite, 7 is the molten furnace charge.

While I have described the invention particularly as applicable to electrolytic cells, for example those used in the electrolytic preparation of aluminum, it is also applicable as indicated above to other furnaces where similar condition exists: i. e. the necessity of introducing a large current into an electrode with a minimum of voltage loss, and a minimum of contamination of the furnace product by the metal of the electrode shell.

The foregoing description has been given for purposes of illustration, and no undue limitations should be deduced therefrom, but the appended claims should be construed as broadly as permissible, in view of the prior art.

Claims:

1. An electrode for use in introducing electric current into an electric furnace, comprising a rod of large cross-sectional area having a lower end composed of baked carbon, and having current-carrying inserts of relatively high specific conductivity inserted in said lower baked end, and projecting out of said electrode.

2. An electrode for use in introducing electric current into a molten electrolyte, comprising a relatively long rod of large cross-sectional area having a lower end composed of baked carbon, and having current-carrying inserts of relatively high specific conductivity inserted in said lower baked end and projecting outwardly through the side of said electrode near said lower end, above the surface of the molten electrolyte.

3. The combination with an electrode for use in introducing electric current into an electric furnace, or removable current-carrying inserts projecting into the electrode near the working end thereof.

4. The combination with a continuous self-baking electrode having a lower baked portion and an upper unbaked portion, of removable current-carrying metallic studs extending into the baked portion of the electrode and through which the current may be introduced to such electrode.

5. The combination with an electrode for use in introducing an electric current into an electric furnace, of removable current-carrying inserts threaded into the electrode from the periphery thereof adjacent its working end and adapted to be removed therefrom by unscrewing.

6. The combination with an electrode for use in introducing electric current into an electric furnace, of hollow removable current-carrying metallic tubes extending into the electrode from the periphery thereof, and adapted to be cooled internally to facilitate the removal of the tubes from the electrode.

7. The combination with a continuous self-baking electrode having a lower baked portion and upper unbaked portion, of removable current-carrying inserts extending into the baked portion of the electrode.

8. The combination with a continuous self-baking electrode having a lower baked portion and an upper unbaked portion, of a series of independent current-carrying inserts embedded in the baked and in the unbaked portion of the electrode.

9. The combination with a continuous self-baking electrode having a lower baked portion and an upper unbaked portion, of a series of current-carrying inserts embedded in the baked and in the unbaked portion of the electrode, such inserts comprising previously baked carbon blocks, and metallic studs removably connected with such carbon blocks.

10. The combination with an electrode for introducing electric current into an electric furnace, of removable tapered current-carrying metallic studs projecting into the electrode near the working end thereof.

11. In the method of continuously supplying an electric current to a molten electrolyte, by means of an electrode dipping into the electrolyte while maintaining the voltage loss at a minimum, the steps which comprise equipping the electrode with a series of removable current-carrying inserts, connecting the inserts adjacent the electrolyte into the electric current, lowering the electrode as it is consumed, successively connecting the inserts higher up on the electrode into the circuit, and disconnecting and removing the inserts which have previously been connected into the circuit.

JENS WESTLY.